3,214,349
RECOVERING PURE SOLVENT BY FILM
DISTILLATION
Edward C. Kehoe and Elwood C. Walker, North Caldwell, N.J., assignors, by mesne assignments, to Saline Water Conversion Corporation, a corporation of New York
Filed Dec. 6, 1962, Ser. No. 242,785
27 Claims. (Cl. 202—52)

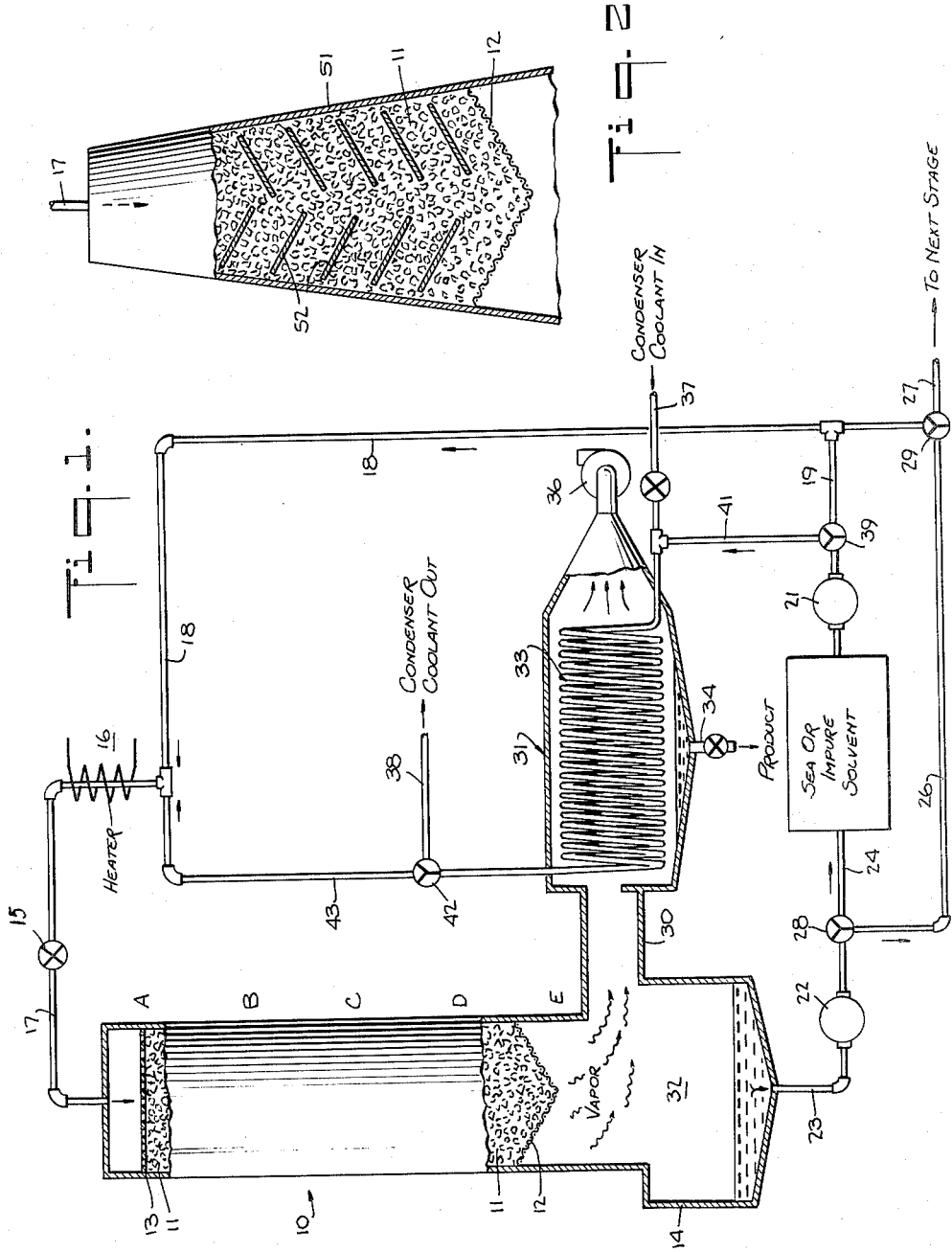

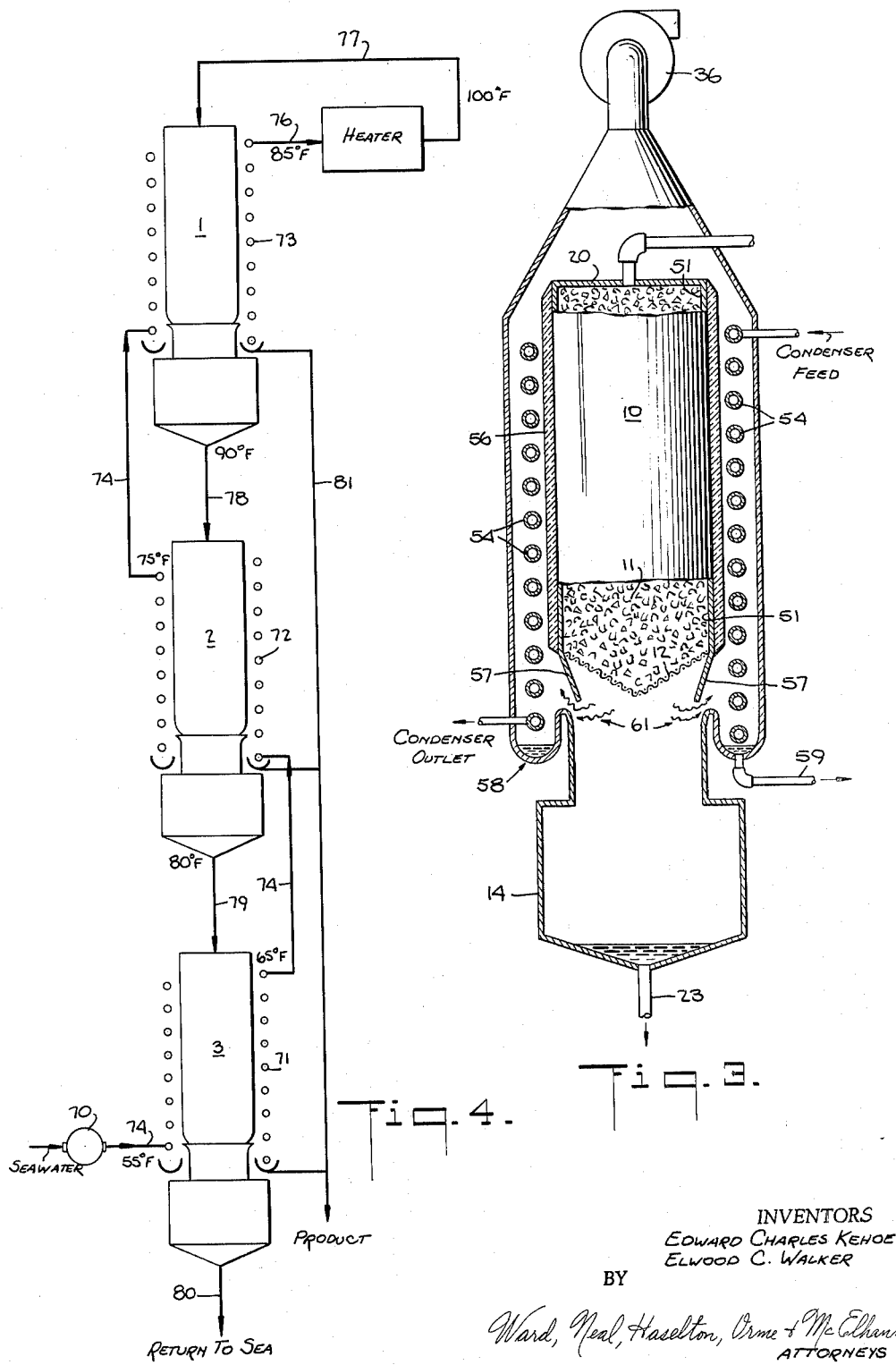

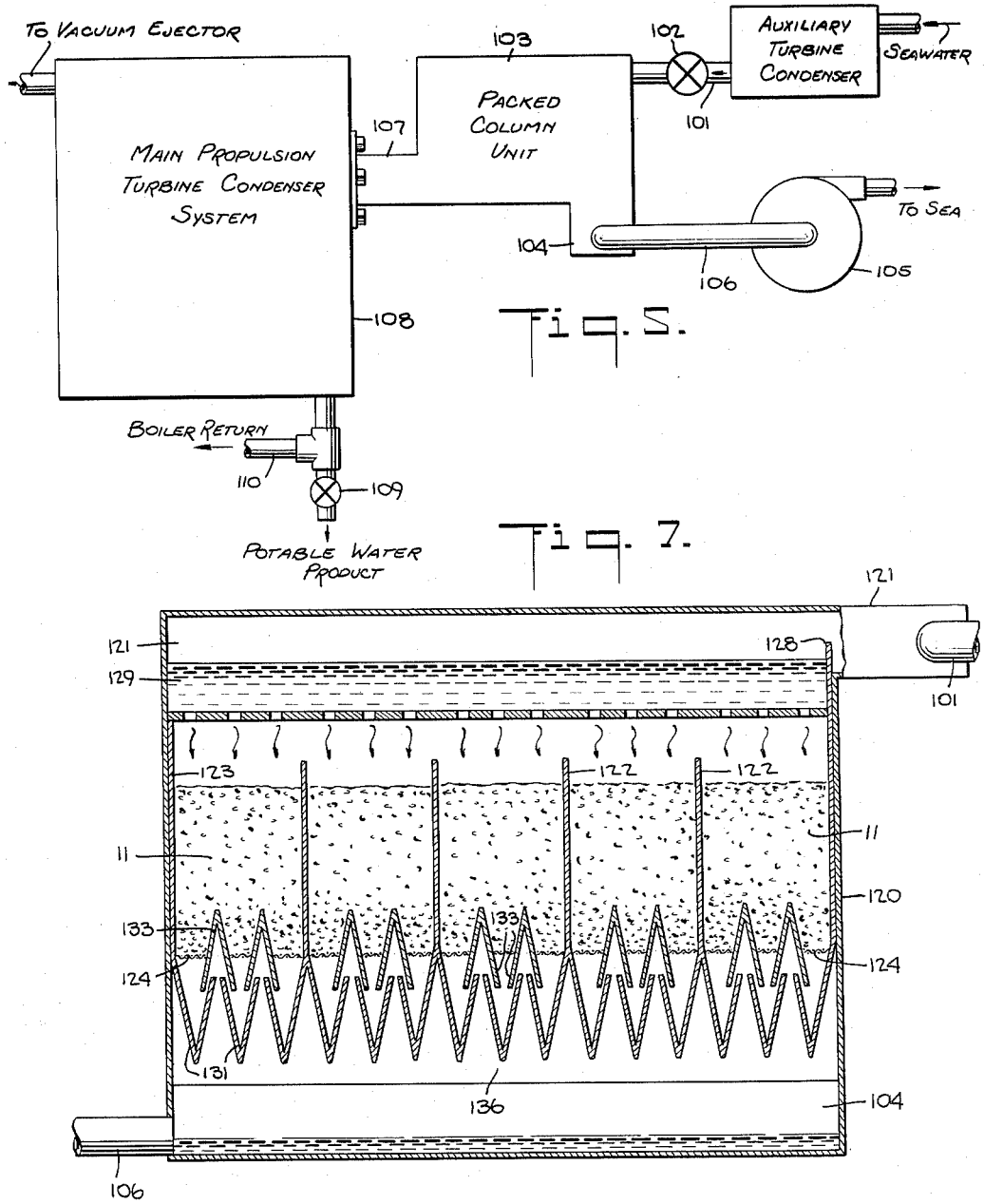

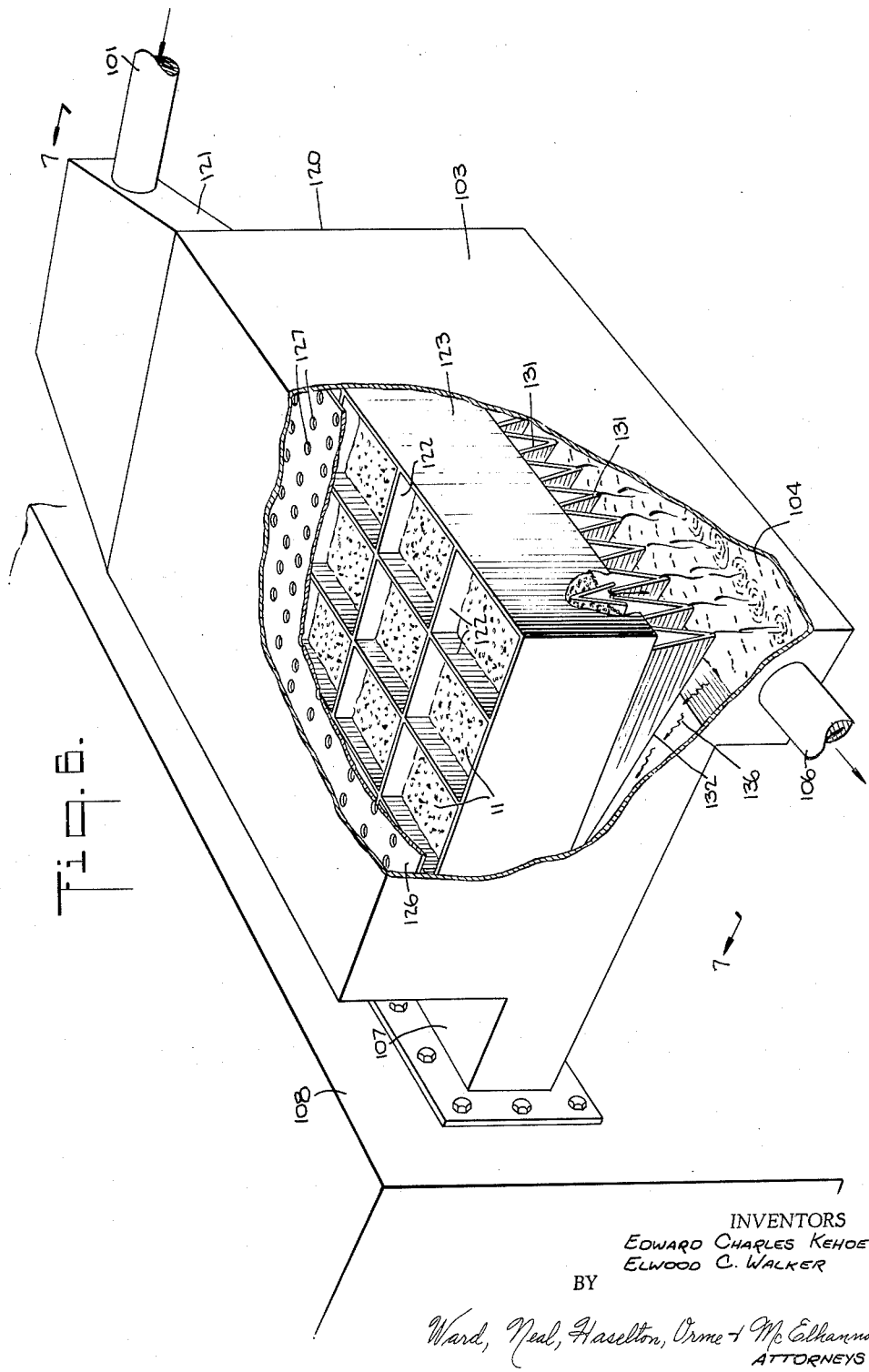

This invention relates to a method and apparatus for recovering substantially pure solvent from a solvent system or solution containing one or more dissolved nonvolatile substances. In its most important application, the method and apparatus are employed to recover potable water from sea or brackish water. Salinities of the order of about two p.p.m. from sea water, as measured by the conductivity method, are easily achieved according to our novel system. The novel apparatus may, of course, be operated to produce somewhat larger quantities of water of a higher specified salinity, but always well within the established limits for potable water. As a matter of convenience our invention is described herein as it relates to the conversion of saline to potable water, but it is equally applicable to the purification of brackish water as well as solvents containing dissolved nonvolatiles. The terms "sea water" and "saline water" shall be understood to include brackish or non-potable water.

The present invention is closely related to the application of Joseph Lichtenstein, Serial No. 241,465, filed November 27, 1962, and constitutes an improvement over the method and apparatus therein described.

Considerable efforts have and are being directed toward the development of a satisfactory yet economical method and apparatus for effecting conversion of saline to fresh water. One such method currently receiving considerable attention is a so-called flash system wherein saline water is heated and introduced as by spraying to a zone of substantially reduced pressure where the water immediately flashes, that is to say, vaporizes exceedingly rapidly. The steam, i.e. vapor, thus produced is then condensed and the condensate collected. The term "flash" as employed herein denotes a substantial pressure differential between liquid water fed to the recovery system and the free space adjacent the liquid water, thus producing very rapid vaporization.

In another such flash system saline water is heated in a vessel and the pressure in the free space above the heated water is suddenly reduced, which causes sudden and violent boiling at the surface. In the body of water contained in the vessel successively lower layers or strata of liquid are subjected proportionately to higher hydraulic pressure. Since flashing occurs because of a substantial pressure differential between the saturation pressure corresponding to the water temperature, which is the same for the whole body of water, and the actual pressure existing in each layer, the flash will be most violent at the surface which is cooled to the saturation temperature corresponding to the pressure existing in the chamber. Successively lower layers form rising bubbles and are cooled so that if the water is deep enough the hydraulic pressure at the lower layers will equal the saturation pressure corresponding to the water temperature and no vaporization will occur, and this portion of the water does not contribute to the formation of vapor. In other words, full utilization of the available thermal energy for vapor formation is not possible. In this system, depending upon the temperature differential of the flash, the upper layers of water release vapor at high velocity with the result that the vapor bubbles leaving the surface tear minute salt water droplets from the liquid phase which are carried in vapor suspension to the condenser where they contaminate, i.e. raise the saline level of the fresh water condensate. The same situation prevails to a more serious extent where hot water is sprayed into a vessel maintained at reduced pressure.

To prevent contamination of the product, the vapor containing entrained salt water must be dried in costly separators, the pressure drop of which reduces the pressure at which condensation can take place and necessitates cooler condensing water to convert a given quantity of vapor into fresh water. Additionally, such flash systems are difficult to control, and since salt and the like are carried over with the vapor, corrosion and scaling of the apparatus present serious problems.

In flash systems, as a general proposition, small volumes of water are heated to comparatively high temperatures, for example, of the order of 200 to 300° F., and thus require high level heat sources. They accordingly depend for any reasonable economy upon substantially complete vaporization of the saline water so heated, which of course also introduces serious scaling problems, as experienced in shipboard evaporators, for example.

The present invention relates to the gradual or diffusion vaporization of solvent from a solution or water from the heated saline water, as distinguished from the rapid or violent flash vaporization systems above described. In our system very much larger volumes of water may be heated comparatively little, for example about 30–50° F. to about 90–110° F., for example, thus enabling utilization of low level heat such as is available at a power plant or from the cooling system of a portable diesel engine or a diesel-generator unit. In the present system, only a very minor portion of the heated water is vaporized under conditions which avoid flashing and scaling of the apparatus is completely avoided, since salt is constantly washed away with the flowing water.

As noted earlier, our invention is closely related to the recovery system described in the aforementioned Lichtenstein application. According to that application heated saline water is disposed in falling thin film attitude over a plurality of spaced vertically arranged plates between which are preferably provided so-called plugs or channel plates to control the cross-sectional dimensions of the channels adjacent the falling film. Except for the plugs the apparatus employed by Lichtenstein to dispose the heated liquid in falling thin film attitude is of the type shown and described in United States Letters Patent No. 2,760,764.

By controlling pressure in the channels between adjacent downwardly flowing water films or between the plug and one water film so that the pressure in the channel over its length is substantially equal to the saturation pressure, i.e. vapor pressure, of the water at any point along the falling film very gradual diffusion vaporization occurs and flashing is avoided. The vaporization of water from the falling film reduces the temperature in the channel and accordingly a pressure differential is created between the foot and the head of the channel.

For a more complete description of the Lichtenstein system reference may be had to the aforementioned copending application. While that system is eminently well suited to the volume production of substantially pure water from saline water utilizing an available low level heat source, the apparatus required to dispose the water in downwardly flowing film attitude is rather complex. For example, a plurality of uniformly spaced and arranged plate members must be provided within a substantially air tight housing, and the tolerances between adjacent plates or between a plate and its respective plug are quite close. Furthermore, uniform distribution of water at the head of each plate to form a falling thin film, and collection of water at the foot of each plate apart from the vapor adjacent the plate at the foot is not easily achieved, the latter particularly in view of the close tolerances necessary at the foot of the plates. Furthermore, the aforementioned device is not susceptible of use aboard ship where rolling and pitching would prevent the semblance of uniform distribution of water at the head of each plate and satisfactory withdrawal at the foot.

Also, if the feed to the head of the plates is suddenly reduced for some reason vaporization down the plates will be greatly retarded whereby the pressure at the head of the plate is substantially lowered and flash vaporization will occur at the head transferring minute droplets of salt water to the vapor at that point.

Accordingly, it is an object of the present invention to provide a diffusion vaporization system for recovery of potable water from saline water which greatly facilitates distribution of heated saline water to the vaporization zone and also greatly facilitates withdrawal of saline water from such zone; it is a further object to provide a system for liquid purification which requires a minimal capital expenditure and yet is capable of converting saline water to any desired reduced salt level and even to substantially less than about ten parts per million.

It is a still further object to provide a diffusion vaporization system for the treatment of saline water which is capable of accommodating unusual and inadvertent pressure changes in the vaporizing zone which may produce flashing and entrainment of salt without any substantial increase in the salinity of the condensed product; and it is yet another object of the present invention to provide a saline water recovery system for use aboard ship which is not sensitive to the rolling and pitching motion of a vessel. Still further objects will be apparent from the following portions of the specification.

Our invention resides in a method and in an apparatus wherein heated saline water to be converted or a heated solution which is to be purified is so introduced to an enclosed body of packing, hereinafter referred to as a column or tower and described in detail, and so distributed therein that the saline water flows downwardly in thin film attitude over the surface of the packing. Sufficient free space is provided in the packing for the formation of water vapor, for example, from the downwardly flowing saline water. Vapor so formed is withdrawn from the body of packing adjacent its foot, collected and condensed at a point remote from the saline water in the system. Approximately 1% by weight of the saline water introduced to the column is vaporized for each 10° F. temperature drop between the head and the foot of the column. The saline water not vaporized is collected below the packing and directed to a next unit or discarded.

Packed columns or towers are well known in the art, and the packing material which may be employed in our column may be chosen from a wide variety of such materials which are readily available. Packings which may be mentioned by way of example include Raschig rings, diaphragm rings, spiral rings, partition rings, Steadman packing of any type, McMahon packing, broken solids, for example, stoveware or pottery, spirals, Lessing rings, Prym rings, Berl saddles, as well as turnings such as steel wool, etc., among many others. These materials may be arranged in packed, stacked or dumped relationship in the column. Thus, virtually any packing material which is employed in a distillation or absorption unit may be employed. However, it is essential that the packing provide a free space for formation of vapor. The restriction provided by the packing causes the pressure drop toward the condenser which enables gradual diffusion vaporization.

Packed columns have been employed widely in small scale distillations and for gas absorption. In the latter instance, the liquid in which it is desired to absorb the gas is introduced at the head and the vapor at the foot of the packed column and gas and liquid phases flow countercurrently through the packing. In a packed column distillation the flow is again essentially countercurrent with the vapor rising through the packing, a portion being condensed and flowing downwardly over the packing countercurrent to the vapors rising in the free space. In the present system heated liquid to be purified is introduced at the head of the packing, as in a gas absorber, but no gas or vapor is introduced at the foot of the column. Vapor formed from the downwardly flowing liquid is induced to flow cocurrently with the liquid and exhausted at the foot of the packing.

Since only a very minor portion of the downwardly flowing liquid is vaporized, for example, from say ½ to about 5%, depending upon the temperature drop between the head and the foot of the column, very substantial quantities of impure liquid must be accommodated at the foot. In a preferred embodiment of the present invention a simple sump is provided below the packing support for gravity flow collection of water leaving the packing. The sump and the packed column may comprise one structural unit or these elements may be suitably joined, but so as to provide adequate vapor flow communication between the free space of the packing and suitable vapor condensing means. This vapor flow channel is so constructed or baffled as to preclude introduction to the vapor moving to the condenser of droplets of saline water dripping or flowing from the foot of the packing.

In the present system the vapor formed in the free space of the packing is induced to reach the foot of the column, that is to say as defined by the packing support, and flow to the condenser in the usual fashion by the pressure differential created as a result of condensation of the vapor.

The absolute pressure established at the foot of the packing in the column, which is essentially equal to the saturation pressure of the water leaving the packing, is imposed on the system by the condenser. If the saline water, for example, entering the head of the packed column at a fixed temperature is to be cooled to a desired temperature at the foot of the column, it is evident that the cooling water temperature and mass flow through the condenser must be properly adjusted so that by condensation of the vapor the desired pressure differential is created, which in accordance with this invention is utilized to overcome the pressure drop in the packed column and for providing the kinetic energy to cause the vapor to leave the foot of the column.

As the saline water flows down over the packing, vapor diffuses very gradually into the free space at conditions of substantial equilibrium. Since vaporization is occurring at each incremental level, the volume of vapor increases toward the foot of the packing as a result of the vaporization at lower points, and the movement of vapor formed above into the lower free space. As volume of water introduced to the head of the column is increased, the vapor formed in the free space also increases and ultimately chokes the vapor passages creating a pressure drop down through the column. At any given point the absolute pressure in the free space is substantially equal to or just very slightly below the saturation pressure of the water in the column at that point. Accordingly, very little energy in excess of the latent heat of vaporization is expended in transfer from liquid to vapor, and this is the condition referred to herein as diffusion vaporization as distinguished from the violent flashing which occurs where the absolute pressure is substantially below the saturation pressure of the water.

Assuming that saline water is introduced to the head of the packed column at about 90° F. and the exit temperature of the condenser coolant is about 70° F. at the start-up of operation, as a small quantity of water is introduced to the head of the packing there is a vacuum corresponding to 70° F., i.e., a ΔP corresponding to about 20° F., and some flashing will occur where the heated saline water is introduced. As the flow of water is increased so also vaporization increases downwardly through the column and the point is soon reached where the volume of vapor in the free space chokes off the column creating a pressure differential between the foot and the head, at which time the absolute pressure adjacent the point of introduction of water at 90° F. substantially equals the saturation pressure at that temperature and vaporization flashing is by slow diffusion. This condition exists throughout the column when the saline water fed thereto is sufficient to enable sufficient vaporization downwardly through the column to choke off the free space therein. If for a given temperature drop from top to bottom of the column the saline water flow is now increased, more vapor will be formed and choking will become more severe by reason of the limited free space, and the zone of pressure difference in the column will move down. In fact, depending upon the quantity of heated saline water fed at the top only the lower third or quarter of a packed column of given length may exhibit a pressure drop, and this length will depend upon the complexity and volume of free space in the packing. As this zone of pressure change moves farther and farther down the salinity of the product gradually increases. Accordingly, a length of packed column may be chosen for a given saline water flow and temperature drop through the column to produce a product of given salinity. Under such conditions as the length of the packed column is increased at constant cross-section salinity of the product is decreased.

The packed column concept of the present invention enables one to handle substantial temperature differentials between the head and the foot of the column since flash vaporization can be tolerated in the upper portion of the packing by reason of the fact that the minute droplets of salt water which pass into the vapor under such conditions are separated lower down in the column as the vapor passes in intimate contact with downflowing water. In this sense the column also acts as a separator. However, in most instances the system will not be so operated.

In a system of the type described, it will be appreciated that the condenser cooling water may also be used as the feed to the packed column thus conserving heat which might otherwise be discarded. For example, water from the sea may be drawn through the condenser and its temperature raised somewhat after which it is then passed to the heater in the system, which latter device then need only make up the internal energy discharged in the warm saline water flowing down through the packing and the heat in the condensed vapor plus any incidental losses in the system. A greater output can be achieved if the total available temperature drop between warm and cold water is divided into multiple effects rather than accommodated in a single stage. When the available temperature differential is quite large, both economy and efficiency dictate multi-effect operation.

The diffusion vaporization system to which our invention is directed is also characterized by its ability to utilize a low grade waste heat for raising the saline water temperature. As indicated above, an outstanding example of such low grade waste heat is the heat absorbed by the cooling water in the last stage of a power plant condenser. Another example is the cooling water of a diesel engine. The heat source may of course be a special unit constructed for the purpose, but it is readily apparent that a salient economic advantage of the system is its ability to function on low grade heat realized at low cost.

There have thus been outlined rather broadly the more important features of our invention in order that the detailed description that follows may be better understood, and in order that our contribution to the art may be fully appreciated. There are, of course, additional features of the invention which are described hereinafter, and which form the subject of the claims appendant hereto.

Certain specific embodiments of the invention have been chosen for purposes of illustration and description and are shown in the accompanying drawings, forming a part of the specification, wherein:

FIG. 1 is a schematic elevation in partial section of a single stage system in accordance with the present invention;

FIG. 2 is a schematic partial sectional elevation of a modified packed column which may be employed in the system of the present invention;

FIG. 3 is a sectional elevation of a preferred column and condenser structure in accordance with the present invention;

FIG. 4 is a schematic representation of a multi-effect system in accordance with the present invention;

FIG. 5 is a schematic elevation illustrating use of the system of this invention aboard ship;

FIG. 6 is cut-away perspective detail of the shipboard unit illustrated generally in FIG. 5; and FIG. 7 is a vertical section taken on the line 7—7 of FIG. 6.

Referring now to the drawings, and more particularly to the FIG. 1 thereof, there is provided a column or tower 10, which is substantially completely filled with a packing material 11 which is supported in the tower in a conventional manner as by a grating, screen, perforated plate or the like 12, which is illustrated in the form of an inverted cone. The choice of a packing support and its configuration will be dictated by the height and cross-section of the column and the weight of packing therein, among other things. However, the free space of support 12 should be at least as great as the average free space within the packing in order to prevent flooding or collection of downwardly flowing liquid just above the support. In the column illustrated there is shown a distributor plate 13 for uniformly apportioning liquid to the packing. A simple grating may be employed or a distributor, i.e., spray head, not shown, may replace plate 13. The column may contain suitable distributors or baffles, not shown, in the packing to promote substantially uniform liquid flow at all points in the column. The technique for supporting packing in the column, distributing the liquid introduced at the head and providing for substantially uniform downflow are well known in the art of gas absorption and are applicable here.

Heated saline water or impure solution is metered through control valve 15 in line 17 from a heat source indicated generally at 16 and delivered to the head of column 10.

Saline water may be delivered to heater 16 through pipes 18 and 19 by means of pump 21 from the sea or other source of saline or brackish water or, wher the system is operated to recover substantially pure solvent, from an impure solvent source. The saline water so introduced to column 10 flows downwardly over the surface of the packing in thin film attitude and collects in a sump 14 illustrated as integral with the column. A pump 22 in sump discharge line 23 returns the water to the sea through pipe 24 or delivers the same to line 26 for recycle through pipe 18 and the heater or to the next stage through pipe 27 as desired by proper manipulation of valves 28 and 29.

A condenser indicated generally at 31 is in vapor flow communication as through conduit 30 with the space 32 below packing support 12 for condensing the vapor leaving the free space of the packing. The vapor is condensed on the cooling coils 33 of the condenser and suitably collected as at the foot of the condenser housing and withdrawn through line 34. The condenser at its cool end is provided with a vacuum pump 36 or other suitable means for removing air or other non-condensables which are introduced to the column in the heated saline water feed or through leaks. It will be noted that the column, sump and condenser are in a closed system.

There are several methods for operating the system, particularly the condenser. In the so-called parallel arrangement a separate coolant is introduced to the condenser through pipe 37 and withdrawn through pipe 38, in which event the heat absorbed by the coolant is discarded. This coolant may of course be drawn from the sea or other source of the solution to be purified provided the same is at a suitably low temperature to effect the necessary condensation. In the so-called series system which is preferred by reason of the fact that less energy is required of heater 16, valve 39 is adjusted to direct sea water through pipe 41 to coils 33 of the condenser and thence by suitable adjustment of valve 42 in line 43 to heater 16, and finally through flow control valve 15 to the head of the packed tower.

Where sump water is to be recycled through the heater to the head of the column some make-up will occasionally be required and this will be drawn from the sea, preferably through condenser coils 31, in which event make-up is effected at the junction of pipes 43 and 18, forward of the heater. Alternatively, make-up may be effected through line 19 to heater feed line 18.

While choking of the vapor in the free space of the packing in the column of the present invention does occur to some extent, there is appreciably more friction encountered by the downflowing vapor in the present column than in the channel system of Lichtenstein. In the latter system most of the pressure drop is due to vapor choking in the channel whereas in the present system most of the pressure drop is caused by friction of the vapor passing through the tortuous passages of the free space. The velocity of the vapors leaving the foot of the packing in the present system is substantially lower, as a result of this greatly increased friction, than the vapor velocity at the foot of the Lichtenstein channel. By reason of this increased friction the pressure drop is of comparatively shorter length in the present system.

In order to accommodate the larger volume of vapor toward the foot of the column, one embodiment of the present system employs a packed column as illustrated in FIG. 2, wherein it will be noted that the column or tower walls 51 taper outwardly toward the foot. That is to say, the packed column is not an upright cylinder, but is rather the frustum of an upright cone. When a column of this shape is employed suitable distributors or baffles as indicated at 52 should be provided to assure as uniform as possible distribution of the downflowing liquid across the packing at any given point.

Regardless of the configuration of the packed column it will be appreciated that as the heated liquid flows downwardly over the packing its temperature falls as a result of evaporation thus producing a lower pressure and an increased volume of vapor down through the column. The inverted cone provides the volume necessary to accommodate the increased volume of vapor in the lower portion of the column. The larger the temperature drop from top to bottom of the packing the greater the taper required to achieve this result. If the taper is not sufficient the efficiency of the column is reduced.

A particularly preferred embodiment of apparatus in accordance with the present invention is illustrated in FIG. 3. Therein it will be noted that packed column 10 provided with a cover 20 is disposed within a housing or shell 53 and the sump 14 is integral with the shell thus enabling control of pressure in the condenser and the packed column. Circular condensing coils 54 are disposed within shell 53 adjacent column walls 51. Suitable lagging 56 insulates column 10 from the substantially cooler condensing coils. While the condenser coils have been shown as extending over substantially the entire length of the packed column, it will of course be understood that condenser cooling area may not dictate such relatively large coils. Also, the condenser coils need not be circular. Our novel concept simply involves the provision of a unitary structure including communicating column, sump and condenser with the condensing coils adjacent at least a portion of the column.

It will be noted that column wall 51 is so shaped or baffles are provided as indicated generally at 57 to direct water dripping from the packing support into sump 14. A trough 58 or other suitable collecting means is provided at the foot of the condenser for collecting condensed vapor, which is withdrawn from the system as product through trough discharge pipe 59. In the embodiment illlustrated shell 53 is so shaped as to provide trough 58. It will be appreciated that the baffles or other means indicated at 57 must prevent saline water passing through packing support 12 from entering the condenser trough, in order that the product not be contaminated. Suitable free space indicated generally at 61 is provided below the packing support to enable free flow of vapor into the condenser shell. As in the embodiment of FIG. 1, suitable exhausting means 36 is provided at the end of the condenser for removing non-condensable gases which enter the system entrained or dissolved in the heated saline water introduced through line 17 to the head of packing 11.

The arrangement of FIG. 3, as this invention is presently envisioned, provides an element of minimum space requirements for use in the system of the present invention. While in FIG. 3 packed column 10 is shown as completely enclosed by housing 53, this is not essential, particularly where the condenser coils may extend along only a portion of the wall of the column. In such a case the housing may terminate at its upper end just above the coils as by welding to the column wall. The column must in any event communicate through its lower open end with the interior of the housing.

The packed column concept enables the handling of very substantial temperature differentials, which of course is dictated by the extent to which the water delivered to the top of the column can be heated and the temperature of the condenser coolant. However, depending upon the available temperature differential, the application of this concept in practice may take the form of a single stage, or the available temperature drop may be distributed in a series of stages or effects, with each effect absorbing a portion of the total temperature differential.

A multi-effect system desirably employs a single flow arrangement in which sea water, for example, is pumped in series through the vapor condenser of each stage, there absorbing the heat of condensation of each stage, thence through the heat source, a power condenser for example, where the heat necessary to cover all the losses of the system is taken up, and then continuing in series as feed water to the packed column of each successive effect, where successive vaporization occurs and water temperature is reduced to the final temperature of discharge from the sump of the last effect.

FIG. 4 is a schematic illustration of such a multi-effect system in which it will be seen that a circulating pump 70 delivers sea water in series through line 74 to the vapor condensers 71, 72 and 73 of stages 3, 2 and 1, respectively. The sea water, for example, may enter condenser 71 at say 55° F. and leave at 65° F., while serving to condense the vapor therein. It continues through condenser 72 where its temperature is raised to 75° F. and finally through condenser 73 where it is heated to 85° F.

The condenser discharge is conducted through pipe 76 to a source of heat where its temperature may be raised to about 100° F. From the heater the water is conveyed through pipe 77 to the head of the packing in stage 1 where it is cooled from 100° F. to about 90° F., giving up a quantity of vapor which is condensed to afford a portion of the system product. The sump water from stage 3 passes through line 78 to the head of the packing of stage 2 where it is further cooled to 80° F., giving up additional vapor which is condensed in this stage. Finally, water at 80° F. from the sump of stage 2 passes through line 79 to the head of the packing in stage 3 where it is cooled to 70° F., gives up still more vapor and is discharged through line 80 to the ocean. Fresh water product is tapped from the condenser well of each stage collected through pipe 81.

It is evident from FIG. 4 that the total head required to convey the sea water through the system consists of the sum total of all pressure losses of the system plus the sum of the pumping heads of all the stages. This head is achieved by pump 70 which supplies the excess head over the atmospheric pressure differential caused by pressure losses in the static head of the heater, for example, a power plant condenser. Therefore, by placing the stages at differential levels, as indicated in FIG. 4, flow through the packed columns may proceed by gravity. While the multi-effect system has been schematically illustrated as one not requiring pumping between the sump of one stage and the head of the next stage, the stages may of course be arranged horizontally and suitable pumps provided where space limitations dictate such an arrangement.

The method of the present invention has been carried out on a bench scale for the purification of saline water of a salinity of 35,000 p.p.m. The apparatus employed was substantially the same as that illustrated in FIG. 1. The column was a two inch I.D. plastic pipe filled with ½ in. Berl saddles to a length of 18 inches. Saline water was fed to the head of the column at rates ranging from about 12.5 to 13 pounds per minute. Salinity of the condensed vapor so produced ranged as low as 2 p.p.m. salt as determined by the temperature corrected conductivity method.

In this bench run temperature measurements were made at the head and at the foot of the column and at three equally spaced intervals between these extremes, indicated as A through E in FIG. 1. Condenser feed and discharge temperatures and flow rate were noted. The system operated at a vacuum of about one inch of mercury. The following table reports the results of this run over a period of six hours and twenty minutes. The quantity of pure water recovered may be calculated from condenser flow rate and temperature drop.

is directed through metering valve 101 in line 102 and delivered to the head of the packing in the column 103. Therein the heated sea water flows downwardly over the surface of the packing and vapor is formed in the free space of the packing as indicated above. Water passing through the column is collected in a sump 104 and discharged by pump 105 in line 106 to the sea. The vapor space at the foot of the packing in column 103 is in vapor flow communication as through duct 107 with the vapor space of the main propulsion turbine condenser system, indicated generally at 108. Therein, vapor from the packed column unit is condensed and a portion of the condensate may be withdrawn as product through valve 109 in the boiler return line on 10.

Successful operation of the present system is of course based upon a temperature differential between the auxiliary and the main condenser. This may easily be achieved by operating the auxiliary condenser at a higher temperature than normal, either by restricting the flow of cooling sea water to the coils thereof or by employing as coolant therefor a portion of the cooling water discharged from the main propulsion condenser, for example.

The condensate in the main propulsion condenser is augmented by the quantity of vapor from the packed column which is condensed, and accordingly potable water may be withdrawn from this condenser to the extent of the increase. Alternatively, some may be retained as boiler make-up. By reason of its high purity, the condensate from the packed column unit will not contaminate the boiler feed. If desired, the packed column unit may be provided with its own separate condenser, or the main propulsion turbine condenser system may be so modified as to isolate the condensate from the packed column unit from the normal boiler feed condensate by suitable partitioning and still one may employ the same cooling water. In the latter event, such coolant may serve to condense vapor from the packed column unit prior to condensing vapor from the main propulsion turbine.

The details of a typical packed column unit for such shipboard use are shown in FIGS. 6 and 7. Therein

| Time (hrs.: mins.) | Column Temperature (° F.) | | | | | Condenser Temp. (° F.) | | Saline Water Feed (lb./min.) | Condenser Flow (lb./min.) | Salinity (p.p.m.) | Vacuum (in. of Hg) |
|---|---|---|---|---|---|---|---|---|---|---|---|
|  | A | B | C | D | E | Discharge | Feed |  |  |  |  |
| Startup | 96.2 | 96.7 | 95.0 | 91.1 | 88.0 | 62.0 | 58.5 | 12.9 | 46.3 | 20.0 | 1.0 |
| 0:30 | 99.0 | 99.9 | 97.2 | 93.1 | 88.8 | 63.5 | 58.5 | 12.8 | 46.4 | 19.5 | 1.0 |
| 0:55 | 101.0 | 101.2 | 98.5 | 94.0 | 89.0 | 64.0 | 58.9 | 12.7 | 46.4 | 16.0 | 1.0 |
| 1:30 | 100.5 | 101.0 | 98.1 | 93.5 | 88.5 | 69.0 | 59.1 | 12.6 | 28.5 | 14.0 | 1.0 |
| 2:0 | 102.0 | 102.5 | 99.2 | 94.1 | 88.8 | 69.9 | 59.5 | 12.6 | 28.5 | 12.0 | 1.0 |
| 2:30 | 102.5 | 103.5 | 101.0 | 95.5 | 89.4 | 71.3 | 60.0 | 12.5 | 28.5 | 11.0 | 1.0 |
| 3:0 | 103.5 | 103.9 | 101.0 | 95.7 | 89.5 | 65.0 | 59.9 | 12.5 | 51.5 | 9.0 | 1.0 |
| 3:30 | 102.1 | 103.0 | 99.8 | 94.5 | 88.1 | 64.6 | 59.0 | 12.5 | 51.5 | 8.0 | .95 |
| 4:0 | 104.0 | 104.5 | 101.1 | 95.6 | 88.6 | 65.0 | 58.8 | 12.5 | 51.5 | 7.2 | .90 |
| 5:0 | 103.0 | 104.0 | 100.2 | 94.5 | 87.0 | 65.0 | 58.0 | 12.5 | 51.5 | 6.0 | .90 |
| 5:22 | 104.1 | 104.2 | 101.5 | 96.2 | 90.0 | 82.0 | 73.0 | 12.6 | 32.4 | 8.0 | .90 |
| 5:35 |  |  |  |  |  |  |  |  |  | [1]2.4 |  |
| 5:55 |  |  |  |  |  |  |  |  |  | [2]2.0 |  |
| 5:58 | 103.2 | 104.0 | 100.9 | 96.0 | 90.9 | 82.0 | 73.5 | 12.7 | 32.3 | 6.5 | 1.0 |
| 6:20 | 103.5 | 104.2 | 101.0 | 96.1 | 91.1 | 81.8 | 73.4 | 12.5 | 32.1 | 7.0 | 1.1 |

[1] Temperature.
[2] Corrected Measurements.

As noted hereinabove, the packed column unit of the present invention is readily adaptable to a shipboard system for recovering potable water from the sea. Shipboard condensers provide both a ready source of low level heat and also means for condensing collected vapor formed in the packed column. The present invention indeed provides a very compact and inexpensive unit for insertion between two shipboard condensers, for example, between the auxiliary power turbine condenser and the main propulsion turbine condenser. Such a system is illustrated in FIG. 5.

A portion of the heated sea water leaving the cooling coils of an auxiliary turbine condenser, for example, it will be seen that the unit comprises a housing 120, the upper portion 121 of which is fed with heated sea water coolant from a turbine condenser source, now shown, through line 101. In the central portion of housing 120, as the same is viewed in elevation, there are disposed a plurality of generally vertically extending members 122, which in combination with the column walls 123 divide the central portion of the column into a plurality of honeycomb chambers, which are preferably of equal cross-section. A packing support 124 is provided at the foot of the chambers for retaining tower packing 11, which may be any of the materials mentioned above, and the chambers are filled almost to the top of the honeycomb dividers 122. Some free space is provided above the packing to prevent undue flooding as the ship rolls and pitches.

A distributing plate 126, provided with substantially uniformly spaced holes 127, is disposed above the honeycomb chambers to distribute water uniformly to the packing therein. A simple weir on dam 128, which may be an extension of column wall 123, and holes 127 in distributor plate 126 may serve to control the level of heated sea water 129 in the upper portion 121 of the housing.

A plurality of troughs 131 disposed below packing support 124 collect water leaving the foot of the packing. These troughs are inclined as indicated at 132 to direct water therein to sump 104 at the foot of the housing, from which the water is discharged overboard through pipe 106. The inclination and depth of troughs 131 is chosen to overcome the effects of pitching or rolling.

Suitable baffles 133, desirably extending up into the packing material, facilitate direction of water flowing down through the packing into troughs 131 and enable egress of vapor from the free space of the packing into a vapor collecting space indicated generally at 136 above sump 104. The baffles also serve to prevent introduction of saline water droplets into the collecting vapor. Vapor collecting space 136 communicates through duct 137 with a turbine condenser system indicated generally at 108 where the vapor is condensed and potable water is recovered.

The unit of FIGS. 6 and 7 applied in a system as illustrated in FIG. 5 with a packing depth of approximately one foot of ½ inch Berl saddles, for example, is capable of producing approximately one gallon of potable water per hour per kwh. of auxiliary turbine load for each 24 square feet of honeycomb cross-section. When employed between auxiliary turbine condenser and main propulsion turbine system, the units permits the production of high quality water on board ship under cruise conditions at minimum space and cost requirements.

From the foregoing it will be seen that we have conceived a novel and highly economical recovery system which may be readily applied to the production of fresh water from saline water.

We claim:

1. A method for continuously recovering substantially pure solvent from a liquid solvent system containing a dissolved non-volatile substance, which comprises heating the liquid, so flowing the heated liquid downwardly through a packed column as to dispose the same in thin film attitude over the surface of the packing, maintaining an absolute pressure in the free space of the packing substantially equal to the saturation pressure of the solvent in the film at any point thereof, thus to induce diffusion vaporization of a portion of the solvent from the flowing film, withdrawing solvent vapor from the column adjacent the foot thereof and condensing the so withdrawn vapor.

2. A method for continuously recovering substantially pure solvent from a liquid solution containing a dissolved non-volatile substance, which comprises so introducing heated solution to the head of a packed column, that the same is disposed in downwardly flowing thin film attitude over the surface of the packing, maintaining an absolute pressure in the free space adjacent the downwardly flowing film substantially equal to the saturation pressure of the solvent in the film at any point thereof, thus to induce diffusion vaporization of a portion of the solvent from the flowing film, collecting solvent vapor adjacent the foot of the packing apart from liquid solution leaving the column, and condensing the so withdrawn vapor.

3. A method for continuously converting saline water to potable fresh water, which comprises so flowing heated saline water downwardly through a packed column as to dispose the water in thin film attitude over the surface of the packing, maintaining an absolute pressure in the free space of the packing adjacent the downwardly flowing film substantially equal to the saturation pressure of the water of the film at any point thereof, thus to induce diffusion vaporization of a portion of the water from the flowing film, withdrawing water vapor from the column adjacent the foot thereof and condensing the so withdrawn vapor.

4. A method for continuously converting saline water to potable fresh water, which comprises heating the saline water, so introducing the heated water to a packed column as to dispose the water in downwardly flowing thin film attitude over the surface of the packing, maintaining an absolute pressure in the free space adjacent the downwardly flowing film substantially equal to the saturation pressure of the water of the film at any point thereof, thus to induce diffusion vaporization of a portion of the water from the flowing film, withdrawing water vapor from the column adjacent the foot of the packing and condensing the so withdrawn vapor.

5. A method for continuously converting saline water to potable fresh water, which comprises heating the saline water, so introducing the heated water to a packed column as to dispose the liquid in downwardly flowing thin film attitude over the surface of the packing, maintaining an absolute pressure in the free space of the packing substantially equal to the saturation pressure of the water of the film at any point thereof, thus to induce diffusion vaporization of a portion of the water from the flowing film, inducing the water vapor so produced to flow through the free space in said packing cocurrently with the saline water film, withdrawing water vapor from said column adjacent the foot thereof, isolating the vapor so withdrawn from downwardly flowing saline water, and condensing the isolated vapor.

6. A method as set forth in claim 5 wherein the heated saline water is introduced to the packed column adjacent the head of the packing.

7. A method as set forth in claim 5, including collecting saline water at the foot of the packed column, raising the temperature thereof and reintroducing the same to the head of the packed column.

8. A method as set forth in claim 5 including collecting saline water at the foot of the packed column and introducing the same to the head of a next stage packed column.

9. A method as set forth in claim 5 employing a plurality of stages, including withdrawing water from the foot of the packed column of the first stage introducing the same to the head of the packed column of the second stage and so on through the last stage, and wherein the saline water is heated by first employing the same to condense vapor produced in the last stage, then to condense vapor produced in the next to last stage and so on through the first state in the system, and then further heating said water prior to introduction to the head of the packed column of the first stage.

10. A method as set forth in claim 6 wherein the quantity of heated saline water introduced to the packed column is so regulated as to enable sufficient vaporization from the flowing film within the packing to choke the free space therein, thereby producing an absolute pressure substantially equal to the saturation pressure of the heated saline water adjacent its point of introduction to the column thus avoiding flash vaporization within the column.

11. In a recovery system of the class described, a column containing supported packing material, means supplying heated liquid from a source to the head of said column whereby the liquid flows downwardly over the surface of the packing therein, means disposed below said packing collecting liquid leaving the foot of said packing, means inducing the vapor formed from the downflowing liquid to flow cocurrently with said liquid through the column, means in vapor flow communication with the packing remote from the liquid in said system for collecting the vapor formed in the packing from adjacent the foot of the column and condensing same, and collecting means for the condensate.

12. In a recovery system of the class described, a column containing supported packing material, means in fluid flow communication with a heated liquid to be purified delivering said liquid from a source to the head of said column whereby the liquid flows downwardly over the surface of the packing therein, a sump for collecting liquid leaving the foot of said packing, means inducing vapor formed in the free space of said packing to flow cocurrently with the liquid through said column, and means to collect vapor adjacent the foot of the column and to condense same remote from the liquid in said system.

13. A recovery system as set forth in claim 12 wherein the means inducing vapor flow comprises the condensing means.

14. A recovery system as set forth in claim 12 including means for heating the liquid to be purified intermediate the liquid source and the head of the packed column.

15. In a recovery system of the class described, a column containing packing material, means delivering heated saline water to the head of said column whereby the water flows downwardly in thin film attitude over the surface of the packing therein, means regulating the quantity of heated saline water so delivered, a sump for collecting saline water leaving the foot of the packing, means maintaining a selected pressure differential between the absolute pressure in the free space and the saturation pressure of the saline water film at any given point in the packing thus to effect diffusion of vapor from the saline water into the free space of the packing, means to induce cocurrent flow of liquid and vapor through the packing material, and means to collect vapor adjacent the foot of the column and to condense said vapor remote from the saline water in the system.

16. A recovery system as set forth in claim 15 wherein the cross-sectional area of the packed portion of the column is greater toward the foot than at the head of the column.

17. A recovery system as set forth in claim 16 wherein said cross-sectional area of the packed portion increases gradually from the head toward the foot of the column.

18. In a multi-stage recovery system of the class described, a column containing packing material, means delivering heated saline water to the head of said column whereby the water flows downwardly in thin film attitude over the surface of the packing therein, means regulating the quantity of heated saline water so delivered, means for collecting saline water leaving the foot of the packing, means maintaining a selected pressure differential between the absolute pressure in the free space and the saturated pressure of the saline water film at any given point in the packing thus to effect diffusion of vapor from the saline water into the free space of the packing, means to induce cocurrent flow of liquid and vapor through the packing material, means to collect vapor adjacent the foot of the column and to condense said vapor remote from the saline water in said system, means to collect the condensate thus formed, one or more further stages similar to the first stage, means delivering saline water collected at the foot of the packing of the first stage in series of said further stages for similar disposition therein, and means heating the saline water delivered to said first stage comprising in part the heat load in the condenser of at least one of such further stages.

19. In a recovery system of the class described, a housing, a closed top column at least partly within said housing and spaced therefrom in vapor flow communication at its lower end with the interior of said housing, a body of packing material within said column, means adjacent the foot of said column supporting the packing material therein, the free space in said support at least equalling the free space of the body of packing whereby the flow of liquid downwardly through said packing is not inhibited, a sump below said packing support means in vapor flow communication with the interior of the housing adjacent the column for collecting liquid passing through said support, vapor condensing means disposed in the space between the wall of said column and said housing, means within said housing below said condensing means for collecting condensate, and means delivering heated liquid to be purified to the head of the body of packing material whereby the liquid flows downwardly over the surface of the packing, said condensing means inducing vapor formed in the free space of the packing to flow downwardly therein through said packing support and to the cooling elements of the condenser.

20. A system as set forth in claim 19 also including means intermediate the packing support and the sump for directing liquid from the packing support into the sump.

21. A method for continuously converting sea water to potable water aboard ship which comprises, so introducing heated sea water from the cooling coils of a shipboard turbine condenser to a packed column as to dispose the water in downwardly flowing thin film attitude over the surface of the packing, maintaining an absolute pressure in the free space of the packing adjacent the downwardly flowing film substantially equal to the saturation pressure of the water of the film at any point thereof, thus to induce diffusion vaporization of a portion of the water from the flowing film, withdrawing the water vapor so formed in the free space of the packing from the column adjacent the foot of the packing, and condensing the so withdrawn vapor.

22. A method as set forth in claim 21 wherein the water vapor withdrawn from the column adjacent the foot of the packing is directed to another shipboard condenser operating at a lower average temperature than the first said condenser.

23. A method for continuously converting sea water to potable fresh water aboard ship, which comprises so introducing heated sea water from the cooling coils of a shipboard auxiliary power condenser to a packed column as to dispose the water in downwardly flowing thin film attitude over the surface packing maintaining an absolute pressure in the free space of the packing adjacent the downwardly flowing film substantially equal to the saturation pressure of the water of the film at any point thereof, thus to induce vaporization of a portion of the water from the flowing film, inducing the vapor so formed to flow downwardly in the free space of the packing, collecting vapor at the foot of the packing and directing the same to the main propulsion condenser, and withdrawing a portion of the condensate therefrom as potable water product.

24. In a shipboard system for recovering potable water from sea water, a column containing supported packing material, means in fluid flow communication with the cooling coils of a shipboard condenser delivering heated sea water therefrom to the head of the packing in said column, means regulating the quantity of heated sea water so delivered to the head of the packing whereby the water flows downwardly through the column in thin film attitude over the surface of the packing, means disposed below the packing collecting water leaving the foot of said packing, means inducing vapor formed in the free space of the packing from the downflowing water to flow cocurrently therewith, means below said packing for collecting vapor leaving the foot of the packing, said latter means being in vapor flow communication with the vapor space of another shipboard condenser, and means for withdrawing from the system a portion of the condensate from the latter condenser.

25. In a shipboard potable water recovery system, a housing in liquid flow communication at its head portion with the cooling coils of a shipboard turbine condenser, a plurality of generally vertically members separating the central portion of said housing into a plurality of honeycomb chambers, means adjacent the foot of said honeycomb chambers for supporting packing material therein, means disposed above said honeycomb chambers for distributing heated sea water from said condenser coils to each of said chambers, whereby the water may flow downwardly in thin film attitude over packing material therein giving up vapor to the free space of said packing, means maintaining a preselected head of said heated sea water to said distributing means, means disposed below said honeycomb chambers for collecting water passing through said packing support means, said housing adjacent its foot providing space below said chambers for collecting of vapor passing through the packing support, means in vapor flow communication with said space for delivering vapor so collected to another shipboard turbine condenser for condensation, and means for withdrawing from the system a portion of the condensate from the latter condenser.

26. A shipboard potable water recovery system as set forth in claim 25 wherein the means for distributing heated sea water to the honeycomb chambers comprises a plate member positioned above said chambers and provided with a plurality of holes which are disposed substantially uniformly across the upper surface of each said chamber.

27. A shipboard potable water recovery system as set forth in claim 25 wherein the means disposed below said honeycomb chambers for collecting water passing through the packing support comprise a plurality of similarly inclined troughs and wherein said housing at its lowest point is so shaped as to provide a sump for receiving water from said inclined troughs.

References Cited by the Examiner
UNITED STATES PATENTS

| | | |
|---|---|---|
| 2,759,882 | 8/56 | Worthen et al. |
| 2,764,533 | 9/56 | Getjen _____ 202—64 X |
| 2,946,726 | 7/60 | Markals _____ 261—97 X |

FOREIGN PATENTS 740,825   11/55   Great Britain.

OTHER REFERENCES

German application, K24,930 Ia–17a, December 1956.

NORMAN YUDKOFF, *Primary Examiner.*